US008655947B1

(12) United States Patent  
Chen et al.

(10) Patent No.: US 8,655,947 B1  
(45) Date of Patent: Feb. 18, 2014

(54) CONTEXT-DEPENDENT SOCIAL NOTES

(75) Inventors: Rita Chen, Forest Hills, NY (US); Sean Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/282,418

(22) Filed: Oct. 26, 2011

(51) Int. Cl.  
*G06F 15/16* (2006.01)

(52) U.S. Cl.  
USPC ............................ 709/203; 709/223; 709/220

(58) Field of Classification Search  
USPC .................................. 709/203, 204, 223, 220  
See application file for complete search history.

(56) References Cited

U.S. PATENT DOCUMENTS

| | | | |
|---|---|---|---|
| 2009/0106415 A1* | 4/2009 | Brezina et al. | 709/224 |
| 2009/0307607 A1* | 12/2009 | Schauls et al. | 715/752 |
| 2009/0307762 A1* | 12/2009 | Cudd, Jr. | 715/230 |
| 2010/0023878 A1* | 1/2010 | Douris et al. | 715/757 |
| 2011/0099153 A1* | 4/2011 | Barraclough et al. | 707/691 |

OTHER PUBLICATIONS

Rogers, R., "How to Delay Sending a Message in Outlook," Tech-Recipes, Sep. 15, 2006, 2 pages, http://www.tech-recipes.com/rx/1638/how_to_delay_sending_message_outlook/.

Macalle, S., "Bizzabo is the New Event Based Social Networking Tool for Professionals," The Next Web, Sep. 15, 2011, 6 pages, http://thenextweb.com/socialmedia/2011/09/15/bizzabo-is-the-new-event-based-social-networking-tool-for-professionals/.

"Bizzabo," Crunch Base, Aug. 30, 2011, 1 page, http://www.crunchbase.com/company/bizzabo.

"What's Bizzabo?" BizzaboMedia channel on Youtube, Jan. 27, 2011, 1 page, http://www.youtube.com/watch?v=5kH-euex-Sg.

Bizzabo official page on Twitter, downloaded Nov. 30, 2011, 1 page, http://twitter.com/#!/Bizzabo.

Butcher, M., "TotalGigs Plans Live Location-based Content Sharing at Music Events [Springboard]," Tech Crunch Europe, Jul. 29, 2011, 1 page, http://eu.techcrunch.com/2011/07/29/totalgigs-plans-live-location-based-content-sharing-at-music-events-springboard.

Laborde, D., "Syncuz Introduces Real-time, Location-based Event Planning App for Android [Video]," Aug. 17, 2011, 4 pages, http://www.talkandroid.com/53714-syncuz-introduces-real-time-location-based-event-planning-app-for-iphone-video/.

* cited by examiner

*Primary Examiner* — Philip B Tran  
(74) *Attorney, Agent, or Firm* — Patent Law Works LLP

(57) ABSTRACT

A user is provided the ability to determine preconditions for making a note from the user viewable by a target audience designated by the user. The preconditions must be met before the note is viewable by the target audience in a display of a client device associated with the target audience. The user may also determine when the note expires, and whether to make the note viewable to the target audience when the note expires.

40 Claims, 14 Drawing Sheets

| UserID | Notification Preference | Display Preference | Notes Left | Notes Viewed |
|---|---|---|---|---|
| UserID #1 | ... | ... | ... | ... |
| UserID #2 | ... | ... | ... | ... |
| ... | ... | ... | ... | ... |
| UserID #U | ... | ... | ... | ... |

FIG. 5

| NoteID | Author | Target Audience | Note | Preconditions | Status |
|---|---|---|---|---|---|
| NoteID #1 | ⋮ | ⋮ | ⋮ | ⋮ | ⋮ |
| NoteID #2 | ⋮ | ⋮ | ⋮ | ⋮ | ⋮ |
| ⋮ | ⋮ | ⋮ | ⋮ | ⋮ | ⋮ |
| NoteID #U | ⋮ | ⋮ | ⋮ | ⋮ | ⋮ |

FIG. 6

CONTEXT-DEPENDENT SOCIAL NOTES

TECHNICAL FIELD

The disclosure generally relates to context-dependent social notes.

BACKGROUND

Every day, people send and receive millions of notes via email (also written as "e-mail") messages and text messages over computer networks for business and leisure. Email and text messages, being convenient, easy to use and close to instantaneous in many cases, have become extremely popular communication channels for people to exchange information.

Traditionally, the relatively instantaneous nature of email messages and text message requires that the sender of the message send the message at the moment the sender wants the recipient to view the message. Additionally, email and text messaging applications are only two of many applications people use. If the recipient of an email or text message receives the message while the recipient is using a different application, the recipient of the message may not be aware of the message until after the sender intended the message to be viewed, at which time the message may appear outdated or inappropriate.

OVERVIEW

According to some aspects of the present disclosure, a method (e.g., a method performed at a client device) for context-dependent social notes includes identifying a target audience entered in a first display at the first client device, and identifying one more notes entered in the first display. The method also includes identifying one or more preconditions entered in the first display, where the one or more preconditions indicate one or more conditions that must be met before the one or more identified notes are viewable by the target audience in a second display at a second client device associated with the target audience. Information regarding the target audience, the one or more notes, and the one or more preconditions are sent toward a server device, for making the one or more notes viewable by the target audience in accordance with the one or more preconditions.

According to some aspects of the present disclosure, a method (e.g., a method performed at a server device) for context-dependent social notes includes identifying a target audience received from a first client device and identifying one more notes received from the first client device. The method also includes identifying one or more preconditions received from the first client device, where the one or more preconditions indicate one or more conditions that must be met before the one or more identified notes are viewable by the target audience in a display at a second client device associated with the target audience. Information regarding the target audience, the one or more notes, and the one or more preconditions are sent toward the second client device, for making the one or more notes viewable by the target audience in accordance with the one or more preconditions.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the present disclosure.

In the drawings:

FIG. 5 depicts a data structure for storing certain user information in accordance with some embodiments of the present disclosure.

FIG. 6 depicts a data structure for storing certain note information in accordance with some embodiments of the present disclosure.

DESCRIPTION OF EXAMPLE EMBODIMENTS

According to some embodiments, a user is provided the ability to determine preconditions for making a note from the user viewable by a target audience designated by the user. The preconditions must be met before the note is viewable by the target audience in a display of a client device associated with the target audience. The user may also determine when the note expires, and whether to make the note viewable to the target audience when the note expires.

Figure 1:
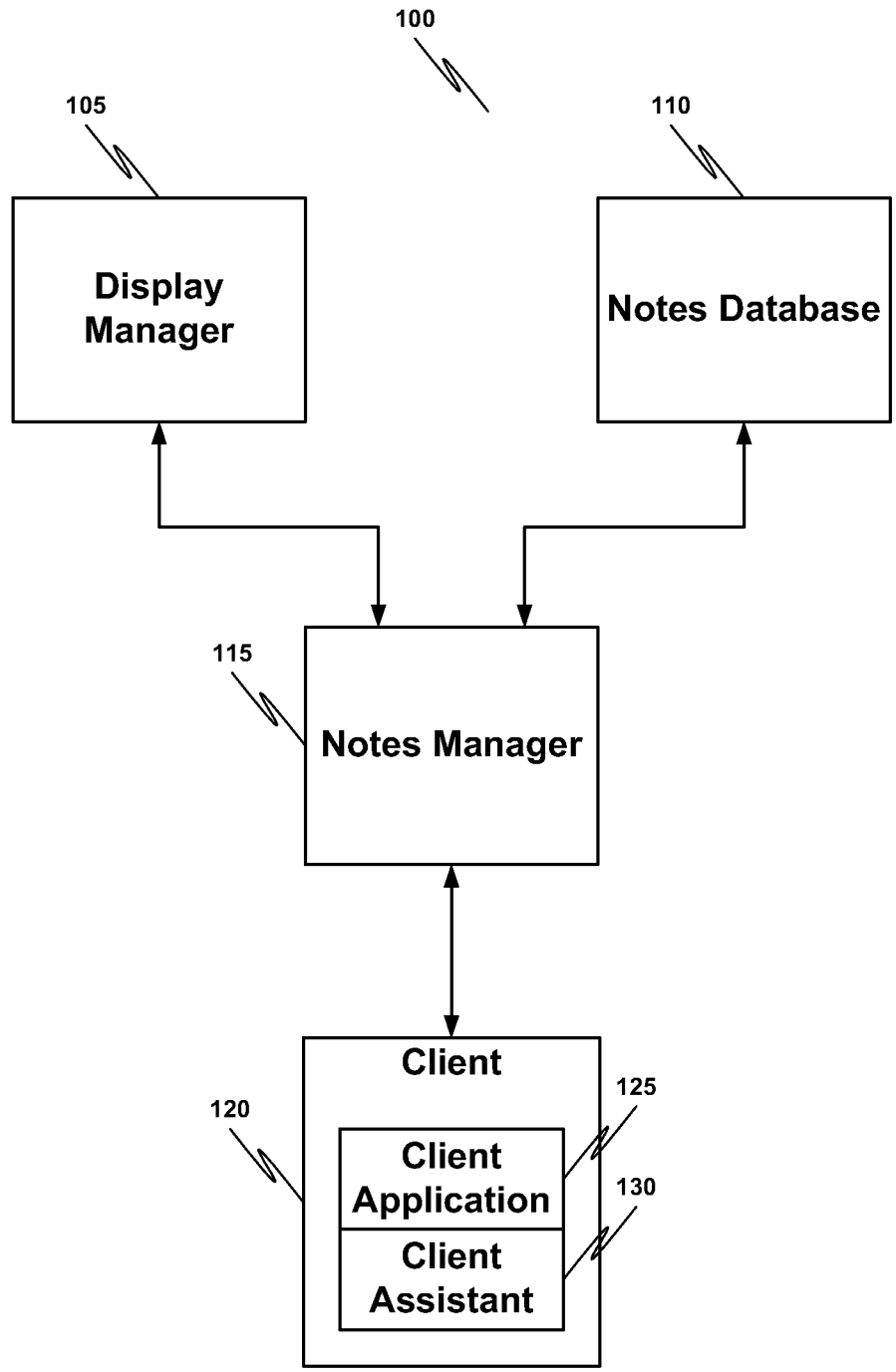
FIG. 1 illustrates a high level functional description of a system in accordance with some embodiments of the present disclosure.

FIG. 1 illustrates a high level functional description of a system 100 in accordance with some embodiments of the present disclosure. A notes manager 115 is connected to a client 120, a display manager 105, and a notes database 110. Notes manager receives from the client 120 information regarding content of the notes, a target audience for the notes, and preconditions for display of the notes to the target audience via client device(s) associated with the target audience, and stores the information in notes database 110. Notes manager 115 also determines whether the preconditions associated with notes stored in notes database 110 have been met, and if the preconditions have been met, interfaces with display manager 105 to make the notes viewable by the target audience via the client device(s) associated with the target audience.

Figure 2:
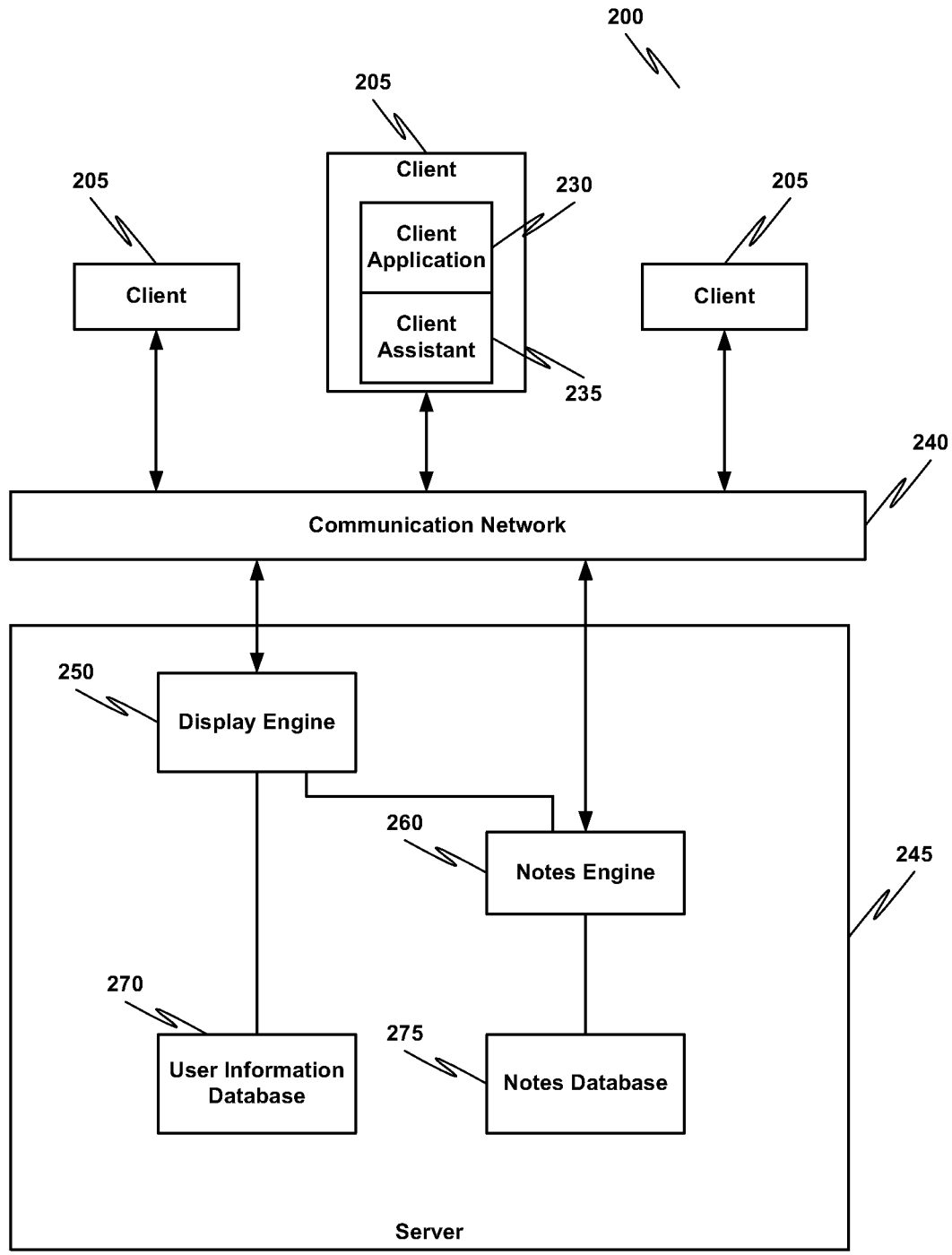
FIG. 2 depicts a block diagram of a system in accordance with some embodiments of the present disclosure.

FIG. 2 depicts a block diagram of a system in accordance with some embodiments of the present disclosure. One or more clients 205 are connected to a communication network 240. The communication network 240 is connected to a server 245. The server 245 includes a notes engine 260, a display engine 250, a user information database 270, and a notes database 275. The notes engine 260 is connected to the communication network 240, the display engine 250, and the notes database 275. The notes engine 260 handles requests from and responses to the client assistant 235, via its connection with communication network 240. The display engine 250 is connected to the communication network 240 and the user information database 270.

Each client 205 includes a client application 230 and a client assistant 235. The client 205 can be any number of devices (e.g., computer, internet kiosk, personal digital assistant, cell phone, gaming device, desktop computer, laptop computer, tablet computer, a television with one or more processors embedded therein or attached thereto, or a set-top box) which may be used to connect to the communication network 240. The communication network 240 may be a wireless, optical, wired or other type of network that facilitates the passage of information. It may include the Internet, one or more local area networks (LANs), one or more wide area networks (WANs), other types networks, or a combination of such networks. The client application 230 is an application that is executed by the client (e.g., browser, e-mail client, word processor) and that displays or presents information to a user of the client (the client application may also perform other tasks not relevant to the present discussion). The client assistant 235 is an application that facilitates the display or presentation of information by the client application 230. The client assistant 235 can be part of the client application 230, a plug-in to the client application 230, stand-alone application, or otherwise (e.g., a JavaScript application downloaded as part of a web page). In some embodiments, the client assistant 235, or portions of the client assistant are downloaded along with messages or other information sent to the client 205. For instance, the client assistant 235 may be one or more scripts (e.g., JavaScript programs) embedded in other content. In this way, different versions of the client assistant 235 are provided to the client 205 without requiring any explicit action by the user of the client 205. Client 205 may also include a location determiner for reporting a geolocation of the client 205.

FIG. 2 is exemplary, in some embodiments, the server 245 contains a subset of or superset of those elements illustrated in FIG. 2. Although FIG. 2 shows the server 245 as a number of discrete items, the figure is intended more as a functional description of the various features which may be present in the server 245 rather than a structural schematic of the embodiments described herein. In practice, and as recognized by those of ordinary skill in the art, items shown separately could be combined and some items could be separated. For example, some items shown separately in the figure could be implemented on a single server and single items could be implemented by one or more servers. The actual number of servers in receipt server 245 and how features are allocated among them will vary from one implementation to another, and may depend in part on the amount of traffic that the system must handle during peak usage periods as well as during average usage periods. For example, any of the user information database 270 and notes database 275 could be implemented as a stand-alone server or servers.

The notes manager 260 receives from the client 205 information regarding notes, a target audience for the notes, and preconditions for display of the notes to the target audience, and stores the information in notes database 275. Notes engine 260 also determines whether the preconditions associated with notes stored in notes database 275 have been met, and if the preconditions have been met, interfaces with display engine 250 to make the notes viewable by the target audience via client device(s) 205 associated with the target audience. The user information database 270 contains information about users associated with client devices 205, including any preferences they may have with respect to the display of items. The notes database 275 includes information about notes, including the content of the note, a target audience for the note, and preconditions for making the note viewable to the target audience.

Figure 3:
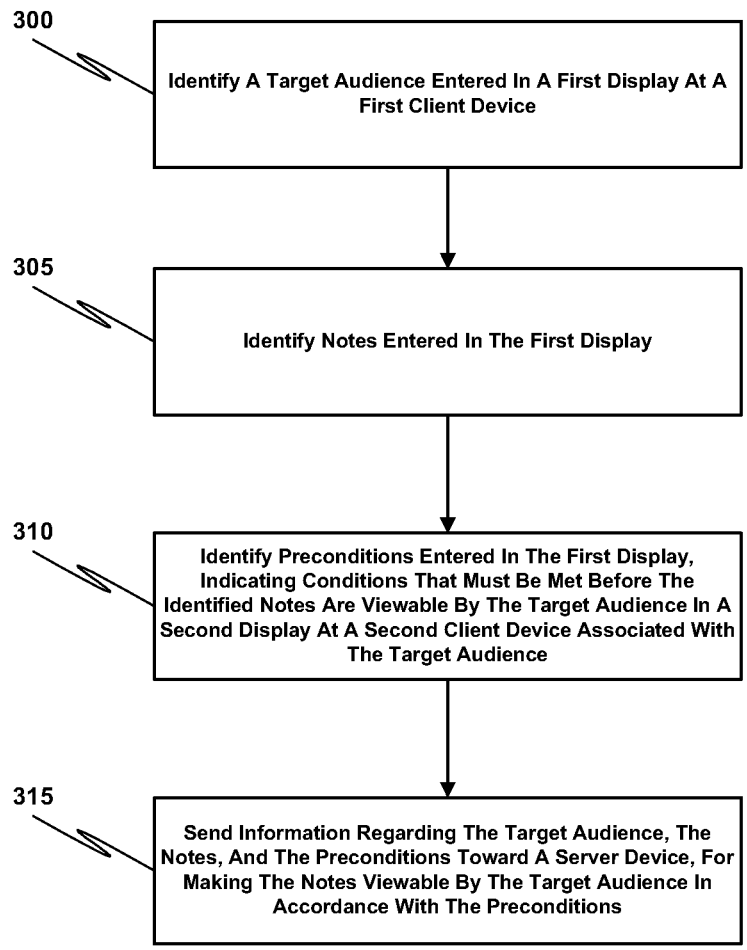
FIG. 3 depicts a process for context-dependent social notes from the perspective of a customer client device in accordance with some embodiments of the present disclosure.

FIG. 3 depicts a process for context-dependent social notes from the perspective of a customer client device in accordance with some embodiments of the present disclosure. At 300, a target audience entered in a first display at a first client device, is identified. The target audience may be identified using, for example, one or more email addresses or usernames associated with members of the target audience. At 305, the content of notes entered in the first display is identified. At 310, preconditions entered in the first display, indicating conditions that must be met before the identified notes are viewable by the target audience in a second display at a second client device associated with the target audience, are identified. Example preconditions are discussed in more detail below. At 315, information regarding the target audience, the notes, and the preconditions tare sent toward a server device, for making the notes viewable by the target audience in a display of a client device associated with the target audience, in accordance with the preconditions.

According to some embodiments, a precondition for making a note viewable by a target audience includes a requirement that the note is viewable after an identified date. For example, a user may indicate that a note to the user's nephew is viewable by the nephew after the date when the nephew is expected to graduate from High School. As a further example, a user may indicate that a note to the user's girlfriend is made viewable by the girlfriend one year after the two first met.

According to some embodiments, user may indicate a note is to be made viewable repeatedly. Using the above example, a user may indicate that a note to the user's girlfriend is made viewable by the girlfriend each year on the anniversary of the day the two first met.

According to some embodiments, a precondition for making a note viewable by a target audience includes a requirement that the note is viewable by the target audience beginning with an identified time. For example, a user may indicate that a note to the user's friend suggesting the friend go to sleep is viewable by the friend after 11 PM on a weekday. As a further example, a user may indicate that a note to the user's mother suggesting the mother check her insulin is viewable by the mother after 3 PM.

According to some embodiments, a precondition for making a note viewable by a target audience includes a requirement that the note is viewable by the target audience beginning with an identified date and time. For example, an auctioneer may indicate that a note to bidders advising that bidding for an auction has closed is viewable by the bidders at the day and time that the auction has closed. As a further example, a user may indicate that a note to a friend taking a Bar exam is made viewable by the friend at the day and time that the Bar Exam results are expected to be made public.

According to some embodiments, a precondition for making a note viewable by a target audience includes a requirement that the note is viewable by the target audience during an identified interval. For example, a soccer coach may indicate that a note to team members to "go to sleep and get ready for the big game on Saturday" is viewable by the team members between 10 PM the previous Friday and 4 AM on Saturday. As a further example, a user may indicate that a note encouraging a friend to vote is viewable by the friend four hours before the polls close.

According to some embodiments, a precondition for making a note viewable by a target audience includes a requirement that the note is viewable by the target audience when the second client device is within a predetermined distance of an identified geolocation. For example, a parent may indicate that a note to a child admonishing the child to "stay away from the candy store" is viewable by the child whenever a client device associated with the child is within 500 feet of the candy store. As a further example, a user may indicate that a note to a friend suggesting the friend "try the fries" is made viewable whenever a client device associated with the friend is within a predetermined distance of a local restaurant, or within a predetermined distance of any restaurant that is part of a chain of restaurants.

According to some embodiments, a precondition for making a note viewable by a target audience includes a requirement that the note is viewable by the target audience when a client device associated with the target audience renders an identified web page. For example, a user may indicate that a note to a friend is viewable by the friend whenever the friend visits the user's favorite comic strip website. As a further example, a user may indicate that a note to a friend suggesting the friend add the user as a beneficiary be viewable by the friend whenever the friend visits a particular retirement account website.

According to some embodiments, a precondition for making a note viewable by a target audience includes a requirement that the note is viewable by the target audience when a client device associated with the target audience executes an identified program on the client device. For example, a user may indicate that a note to a friend is viewable by the friend whenever the client device associated with the friend executes a particular gaming application. As a further example, a user with a friend living in an area known for inclement weather may indicate that a note to the friend reminding the friend of how nice the weather is somewhere else, is to be made viewable by the friend whenever the client device associated with the friend executes a particular weather application.

According to some embodiments, the one or more preconditions indicate the one or more identified notes are viewable by the target audience upon the occurrence of an identified event. For example, a user may indicate that a note to a friend in San Jose asking the friend to call the user is viewable by the friend whenever an earthquake within ten miles of San Jose and measuring at least 6.0 on the Richter scale is reported. As a further example, a user may indicate that a note to the user's parent advising the parent to stay indoors be made viewable by the parent whenever the outside temperature within a predetermined distance of a client device associated with the parent is above a predetermined temperature or below a predetermined temperature.

According to some embodiments, the method further includes identifying an expiration value entered in the first display, the expiration value indicating when the one or more identified notes are viewable by the target audience even if the one or more preconditions are not met. For example, a user may indicate that a note to a friend asking if the friend remembers visiting "ABC Coffee Shop" last year is viewable by the friend if the friend visits ABC Coffee Shop within three days of the one year anniversary of when the user and the friend visited ABC Coffee Shop together. The user may also indicate that the note will expire 13 months after the one year anniversary, so as to avoid appearing inappropriate if viewed by the friend several days after the one year anniversary.

The user may also indicate what happens to a note upon expiration if the preconditions have not yet been met. According to some embodiments, the user may indicate that the note be deleted. According to other embodiments, the user may indicate that the note be archived. According to still other embodiments, the user may indicate that the note be made viewable by the target audience despite the fact that the preconditions have not been met.

Figure 4:
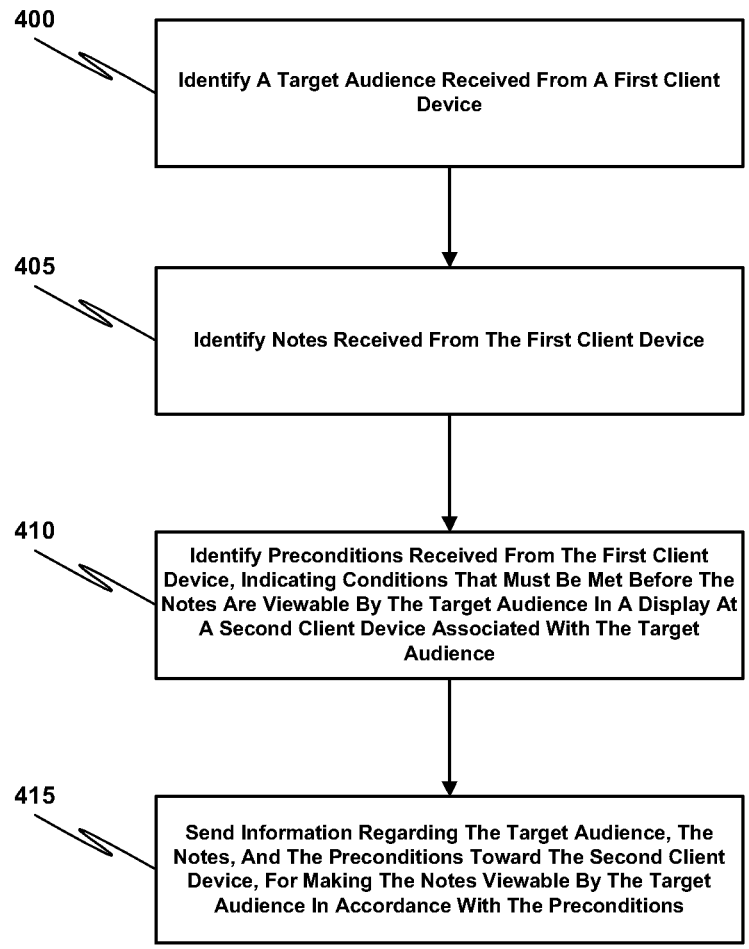
FIG. 4 depicts a process for context-dependent social notes from the perspective of a server in accordance with some embodiments of the present disclosure.

FIG. 4 depicts a process for context-dependent social notes from the perspective of a server in accordance with some embodiments of the present disclosure. At 400, a target audience received from a first client device is identified. The target audience may be identified using, for example, one or more email addresses or usernames associated with members of the target audience. At 405, the content of notes received from the first client device are identified. At 410, preconditions received from the first client device, indicating conditions that must be met before the notes are viewable by the target audience in a display at a second client device associated with the target audience, are identified. Example preconditions are discussed in more detail below. At 415, information regarding the target audience, the notes, and the preconditions are sent toward the second client device, for making the notes viewable by the target audience in accordance with the preconditions.

Figure 11:
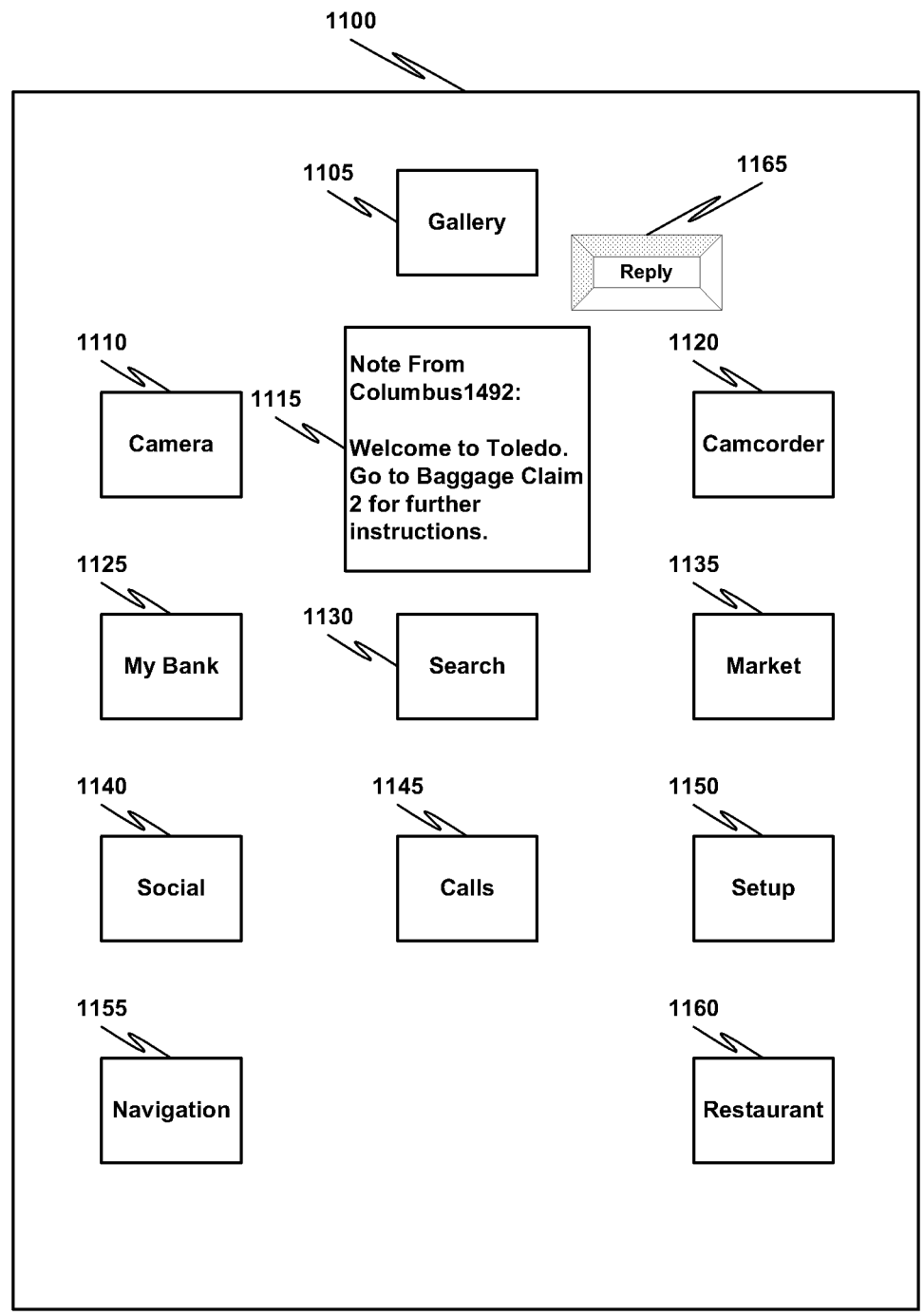
FIG. 11 depicts a display including a note box in accordance with some embodiments of the present disclosure.

FIG. 5 depicts a data structure for storing certain user information in accordance with some embodiments of the present disclosure. FIG. 11 illustrates an exemplary user table 500 in a user information database 270 which is used in some embodiments to store information about users. In some embodiments, table 500 includes a plurality of records, each having a userID portion 505 and one or more other portions containing information about the user. Table 500 includes one or more records such as record 530 associated with a userID #1, and record 545 associated with a userID #U, where U represents the number of users with a record in user table 500. The record 530 includes one or more items of information about a user, such as the user's notification preference 510, display preference 515, notes left 520, and notes viewed 525. The notification preference may indicate how the user prefers to be notified, for example which devices should display a note, and whether the rendering of the note should be accompanied by an audible, tactile, or visual cue. The display preference 515 may indicate a user's preferences with regard to the display of information, and how much information about the user is disclosed to third parties. According to some embodiments, no user information is disclosed to third parties by default. Record 530 may also indicate notes that a user has left. Record 530 may also indicate notes of a user that have been viewed 525 by the target audience. The entries in any particular record 530, 535, 540, and 545 are merely exemplary. In some embodiments, users may have differing sets of entries in their respective record.

Figure 6:
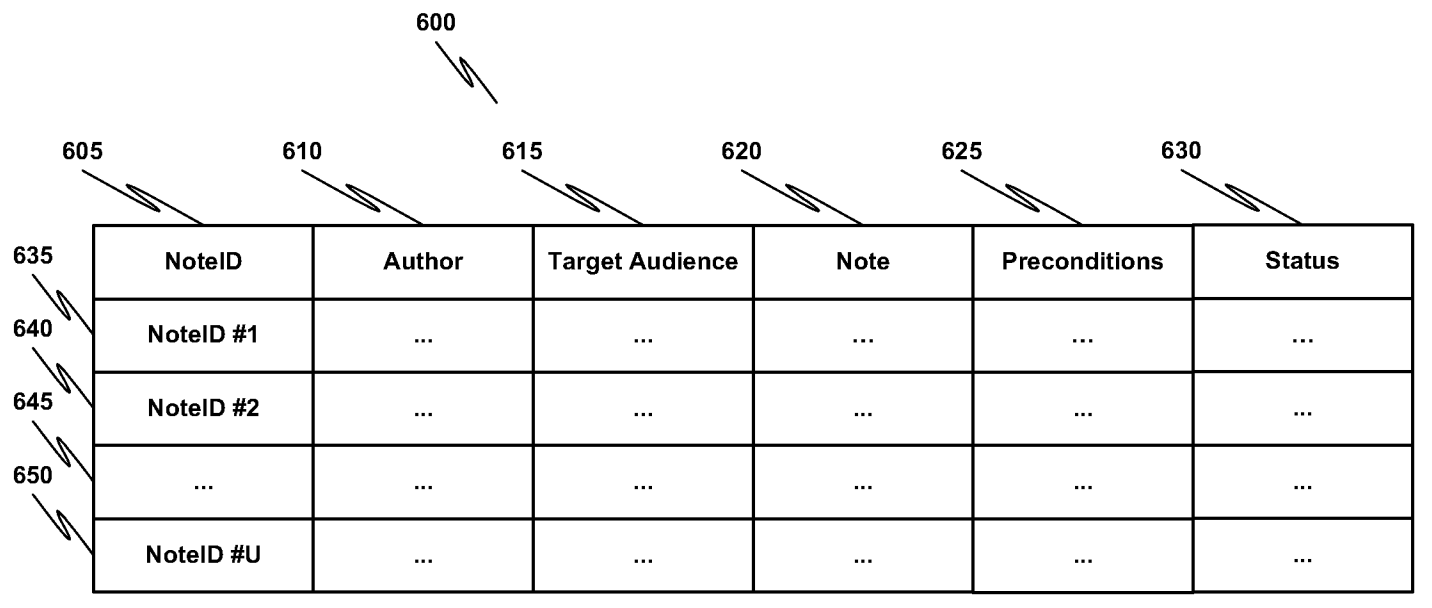

FIG. 6 depicts a data structure for storing certain note information in accordance with some embodiments of the present disclosure. FIG. 6 illustrates an exemplary table 600 in a notes database 275 which is used in some embodiments to store information about notes. In some embodiments, table 600 includes a plurality of records, each having a noteID portion 605 and one or more other portions containing information about the note. Table 600 includes one or more records such as record 635 associated with a noteID #1, and record 650 associated with a noteID #U, where U represents the number of notes with a record in note table 600. The record 635 includes one or more items of information about a note, such as the author of the note (610), the target audience of the note (615), the content of the note 620, preconditions for making the note viewable (625), and a status of the note (630). The author of the note (610) indicates which user created the note. The target audience 615 indicates which users the author of the note wants to see the note with the preconditions associated with the note have been met. The note content 620 may be, for example, the text of the note. The preconditions 625 are the conditions that must be met before the associated note 620 is viewable by the target audience 615, as described above. The status 630 indicates the status of the note 620, for example which members of the target audience 615 have viewed the note 620, whether the note has expired, and whether the preconditions 625 associated with the note 620 have been met. The entries in any particular record 635, 640, 645, and 650 are merely exemplary. In some embodiments, notes may have differing sets of entries in their respective record.

Figure 7:
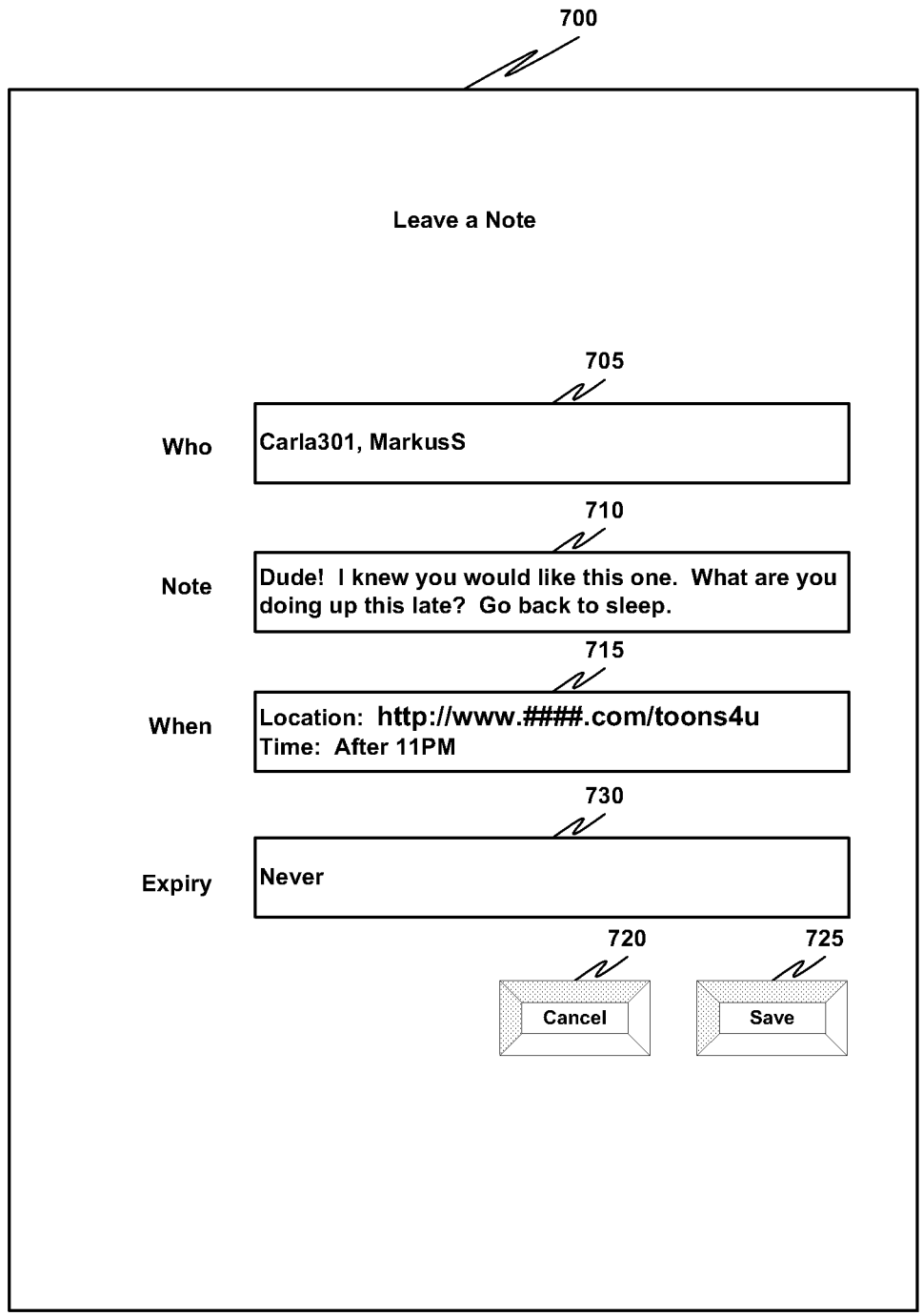
FIG. 7 depicts an exemplary note configuration display in accordance with some embodiments of the present disclosure.

FIG. 7 depicts an exemplary note configuration display in accordance with some embodiments of the present disclosure. Display 700 includes a box 705 for entering a target audience for a note. Display 700 also includes a box 710 for entering the content of a note. Display 700 also includes a box 715 for entering the preconditions which must be met in order for the note in box 710 to be viewable by the target audience indicated in box 705. Display 700 also includes a box 730 for entering an expiry value for the note. According to some embodiments, display 700 also includes a box for entering an action to be taken upon expiry of the note, for example deleting the note or making the note viewable by the target audience despite the fact that the preconditions for the note have not been met. Once a user has entered information as shown in display 700, the note shown in box 710 will be made viewable by users "Carla301" and "MarkusS" when their respective client devices navigate to http://www.####.com/toons4u after 11 PM. As indicated in box 730, the note will not expire before the preconditions in box 715 are met. Display 700 also includes a button 725 which, when clicked on, causes the information entered in boxes 705, 710, 715, and 730, be saved. Display 700 also includes a button 720 which, when clicked on, causes the information entered in boxes 705, 710, 715, and 730, be discarded.

Figure 8:
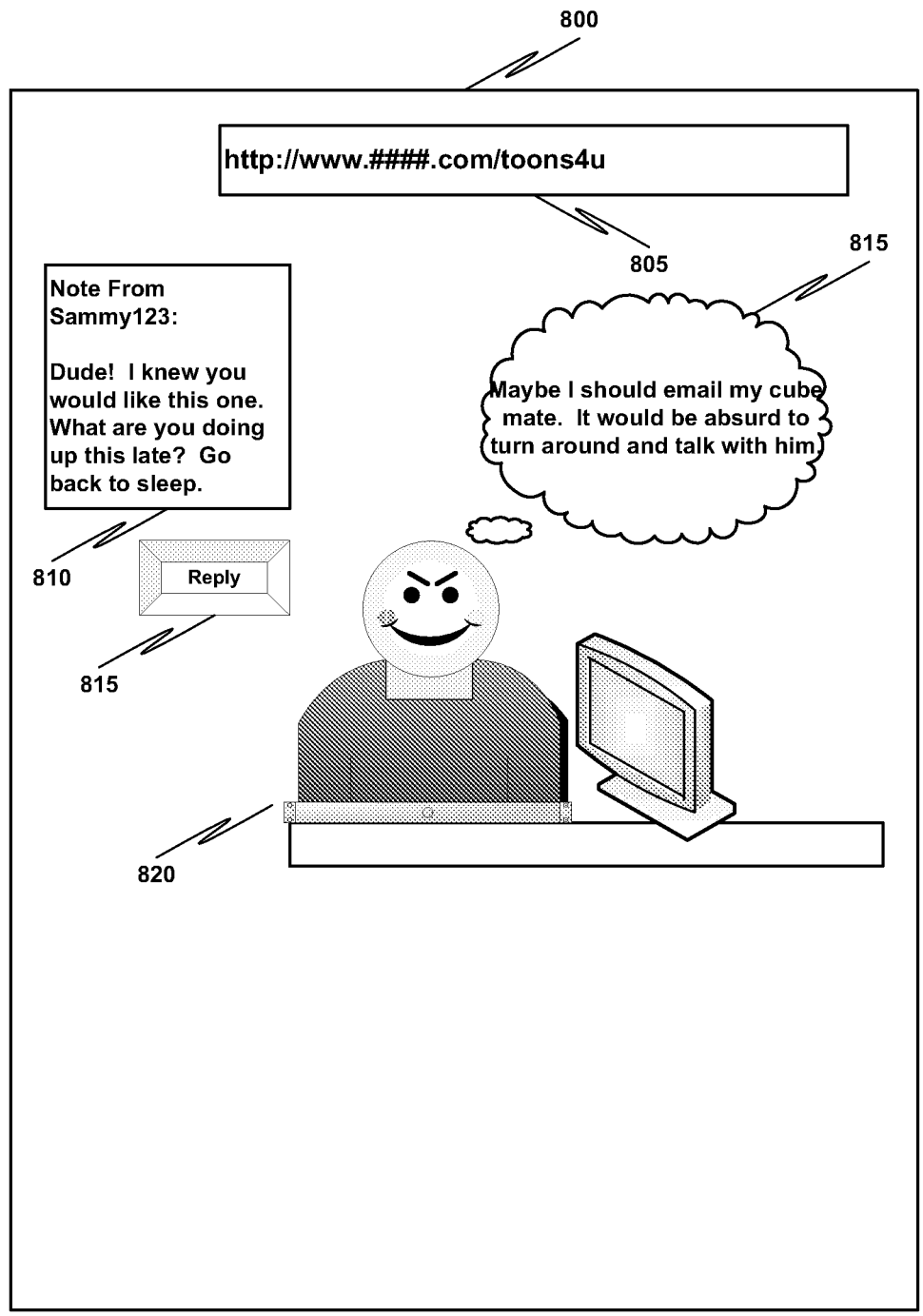
FIG. 8 depicts a display including a note box corresponding to the configuration display of FIG. 7 in accordance with some embodiments of the present disclosure.

FIG. 8 depicts a display including a note box corresponding to the configuration display of FIG. 7 in accordance with some embodiments of the present disclosure. Display 800 includes a location box 805 indicating the user (e.g. "Carla301" or "MarkusS" indicated in FIG. 7) has navigated to http://www.####.com/toons4u. If the user navigated to this address after 11 PM, the preconditions in FIG. 7 have been met, thus note box 810 containing the note shown in box 710 of FIG. 7 is presented to the user. Display 800 also includes a reply button 815 for replying to the author of note 810. For example, client device 205 may be configured to reply to the author via an email message, a text message, another note, or the like.

Figure 9:
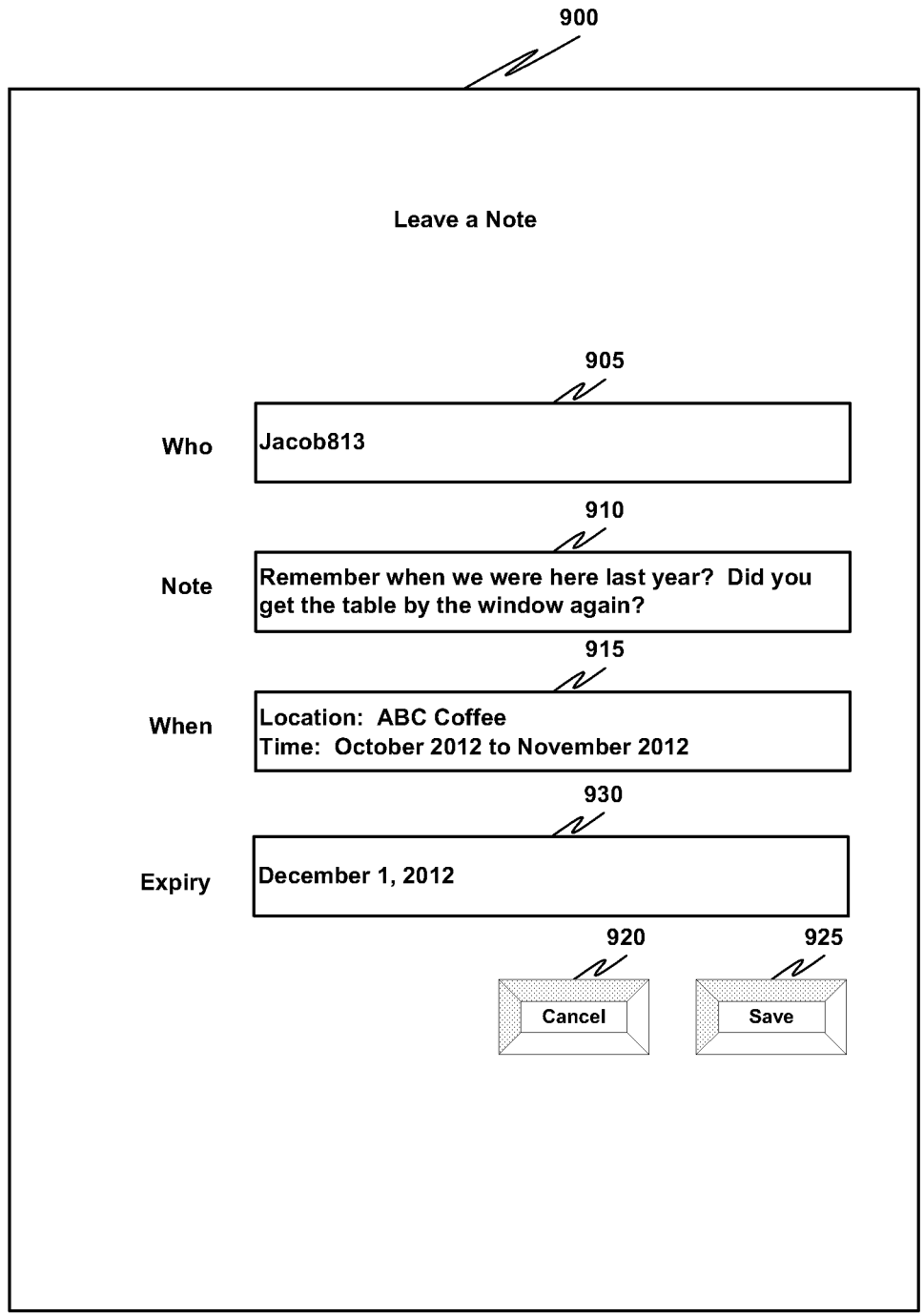
FIG. 9 depicts an exemplary note configuration display in accordance with some embodiments of the present disclosure.

FIG. 9 depicts an exemplary note configuration display in accordance with some embodiments of the present disclosure. Display 900 includes a box 905 for entering a target audience for a note. Display 900 also includes a box 910 for entering the content of a note. Display 900 also includes a box 915 for entering the preconditions which must be met in order for the note in box 910 to be viewable by the target audience indicated in box 905. Display 900 also includes a box 930 for entering an expiry value for the note. According to some embodiments, display 900 also includes a box for entering an action to be taken upon expiry of the note, for example deleting the note or making the note viewable by the target audience despite the fact that the preconditions for the note have not been met. Once a user has entered information as shown in display 900, the note shown in box 910 will be made viewable by user "Jacob813" when a client device associates with user Jacob813 reports a geolocation indicating the client device is within a predetermined distance of "ABC Coffee," during the period from October 2012 to November 2012. As indicated in box 930, the note will expire on Dec. 1, 2012 if the preconditions in box 915 are met. Display 900 also includes a button 925 which, when clicked on, causes the information entered in boxes 905, 910, 915, and 930, be saved. Display 900 also includes a button 920 which, when clicked on, causes the information entered in boxes 905, 910, 915, and 930, be discarded.

Figure 10:
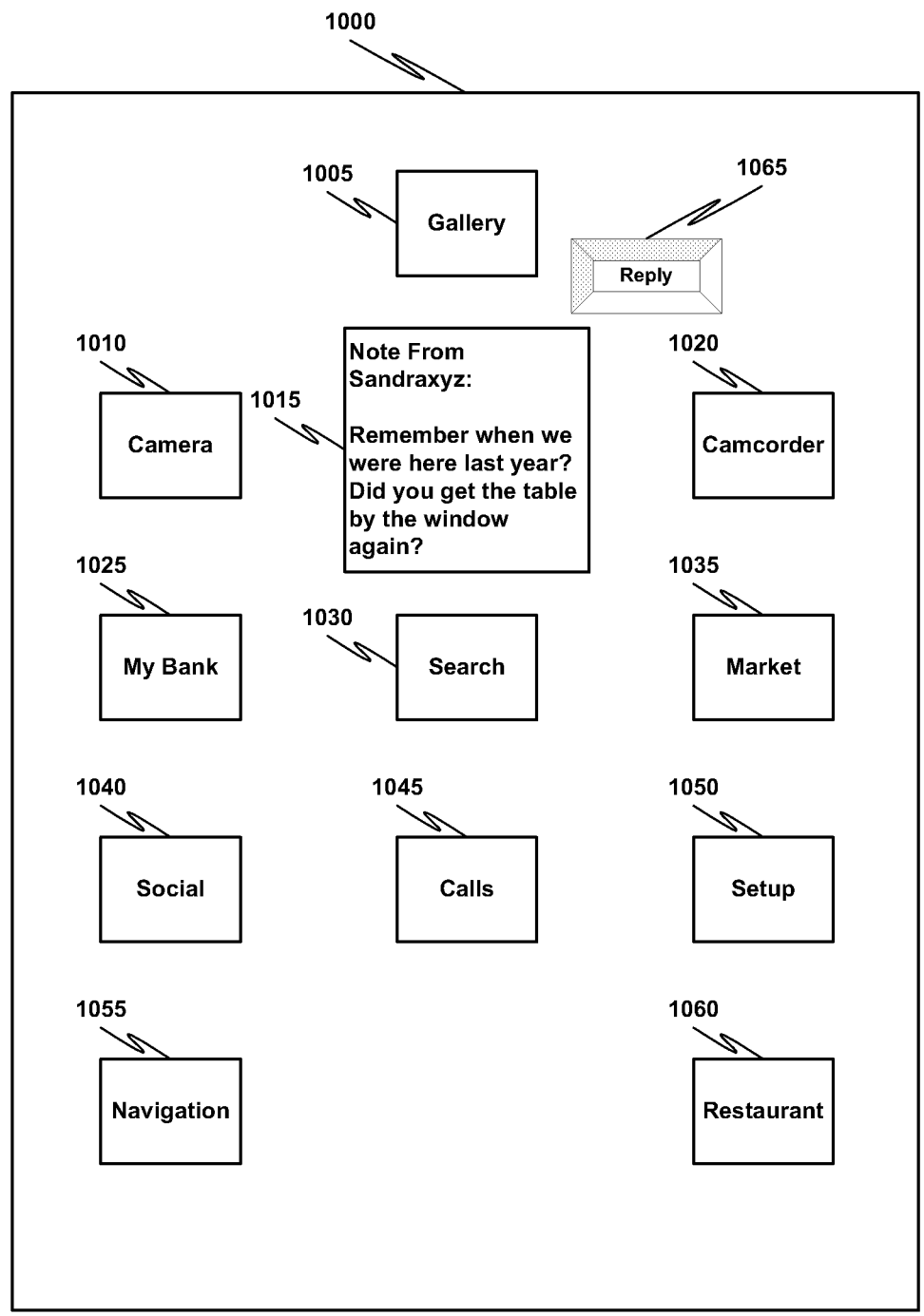
FIG. 10 depicts a display including a note box corresponding to the configuration display of FIG. 9 in accordance with some embodiments of the present disclosure.

FIG. 10 depicts a display including a note box corresponding to the configuration display of FIG. 9 in accordance with some embodiments of the present disclosure. Display 1000 is displayed on a client device associated with user "Jacob813" indicated in box 905 of FIG. 9. When a client device associated with user Jacob813 reports a geolocation within a predetermined distance of "ABC Coffee" indicated in box 915 of FIG. 9, and if that geolocation is reported between October 2012 and November 2012, note box 1015 is presented, which includes the content of box 910 of FIG. 9. Display 1000 also includes a reply button 1065 for replying to the author of note 1015. For example, client device 205 may be configured to reply to the author via an email message, a text message, another note, or the like.

Figure 12:
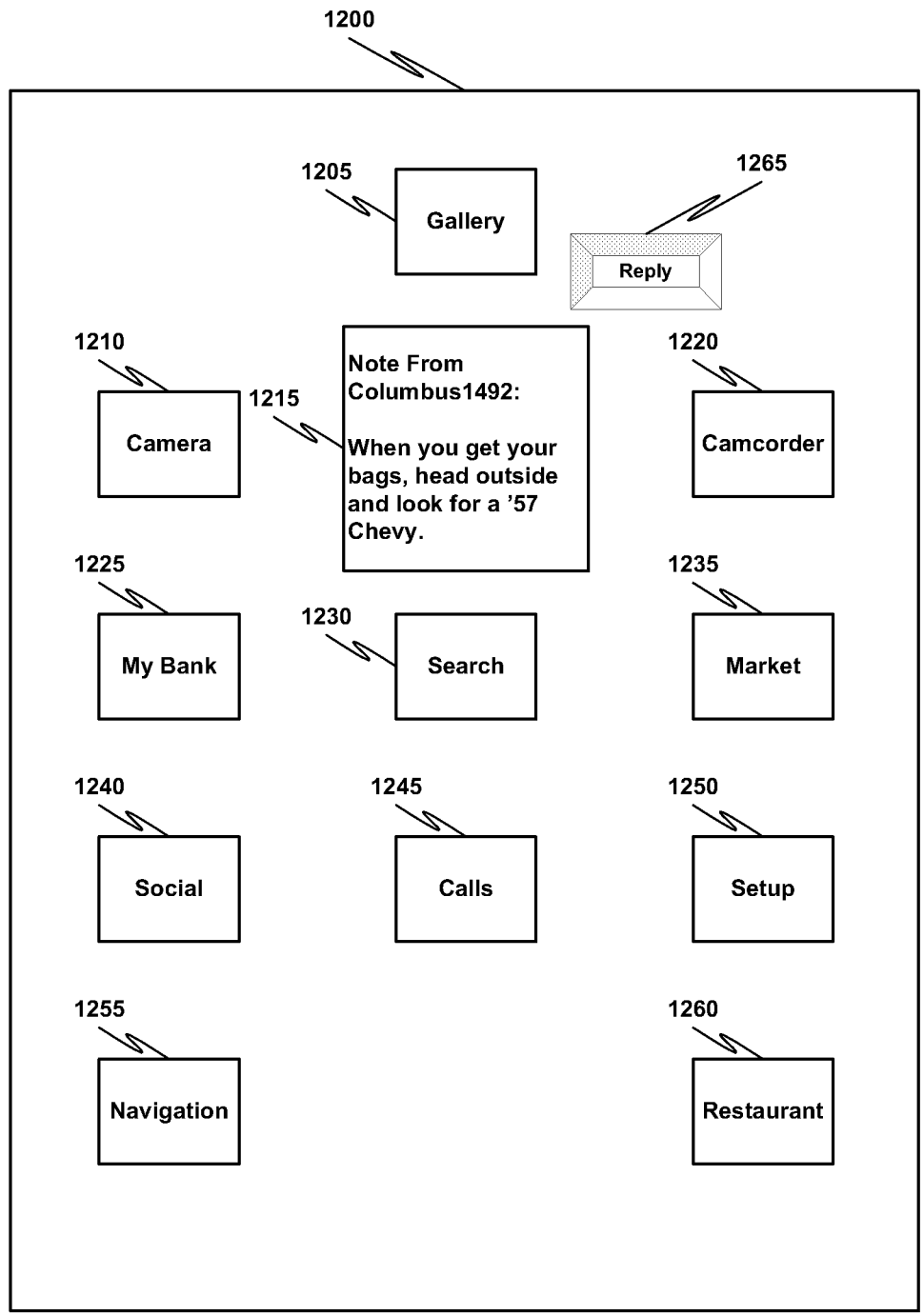
FIG. 12 depicts a display including a note box in accordance with some embodiments of the present disclosure.

FIGS. 11 and 12 illustrate configuring a series of notes for display to a target audience in sequence. FIGS. 11 and 12 assume user "Columbus1492" knows a second user will be travelling to Columbus airport, and will probably go to the baggage claim area before leaving the airport.

FIG. 11 depicts a display including a note box in accordance with some embodiments of the present disclosure. The preconditions for the note shown in box 1115 include a geolocation within a predetermined distance of the Columbus airport terminal area. Display 1100 also includes a reply button 1165 for replying to the author of note shown in box 1115. For example, client device 205 may be configured to reply to the author via an email message, a text message, another note, or the like.

FIG. 12 depicts a display including a note box in accordance with some embodiments of the present disclosure. The preconditions for the note shown in box 1215 include a geolocation within a predetermined distance of the Columbus airport baggage claim area. Display 1200 also includes a reply button 1265 for replying to the author of note shown in box 1215. For example, client device 205 may be configured to reply to the author via an email message, a text message, another note, or the like.

Figure 13:
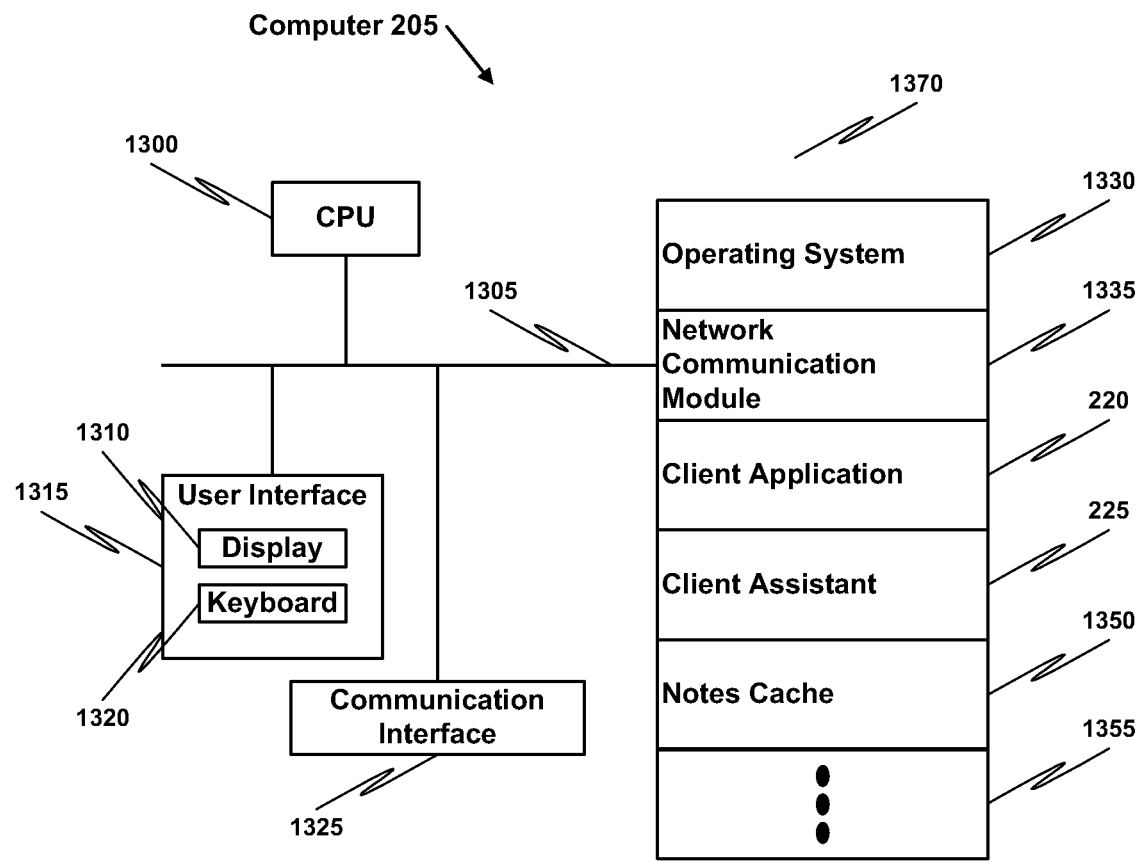
FIG. 13 depicts a client device in accordance with some embodiments of the present disclosure.

FIG. 13 depicts a client device in accordance with some embodiments of the present disclosure. A customer client system 205 typically includes one or more processing units (CPU's) 1300, one or more network or other communications interfaces 1325, memory 1370, and one or more communication buses 1305 for interconnecting these components. The client system 205 may include a user interface 1315, for instance a display 1310 and a keyboard 1320. The memory 1370 may include high speed random access memory and may also include non-volatile memory, such as one or more magnetic or optical storage disks. The memory 1370 may include mass storage that is remotely located from CPU's 1300. The memory 1370 may store the following elements, or a subset or superset of such elements: an operating system 1330 that includes procedures for handling various basic system services and for performing hardware dependent tasks; a network communication module (or instructions) 1335 that is used for connecting the customer client system 205 to other computers via the one or more communications interfaces 1325 (wired or wireless), such as the Internet, other wide area networks, local area networks, metropolitan area networks, and so on; a client application 220 as described above; a client assistant 225 as described above; optionally, a cache of downloaded notes 1350, as well as other information for viewing using the client application 125, and information retrieved by user selection of one or more items. The client system 205 may also include a location determiner for reporting a geolocation of the client system.

Figure 14:
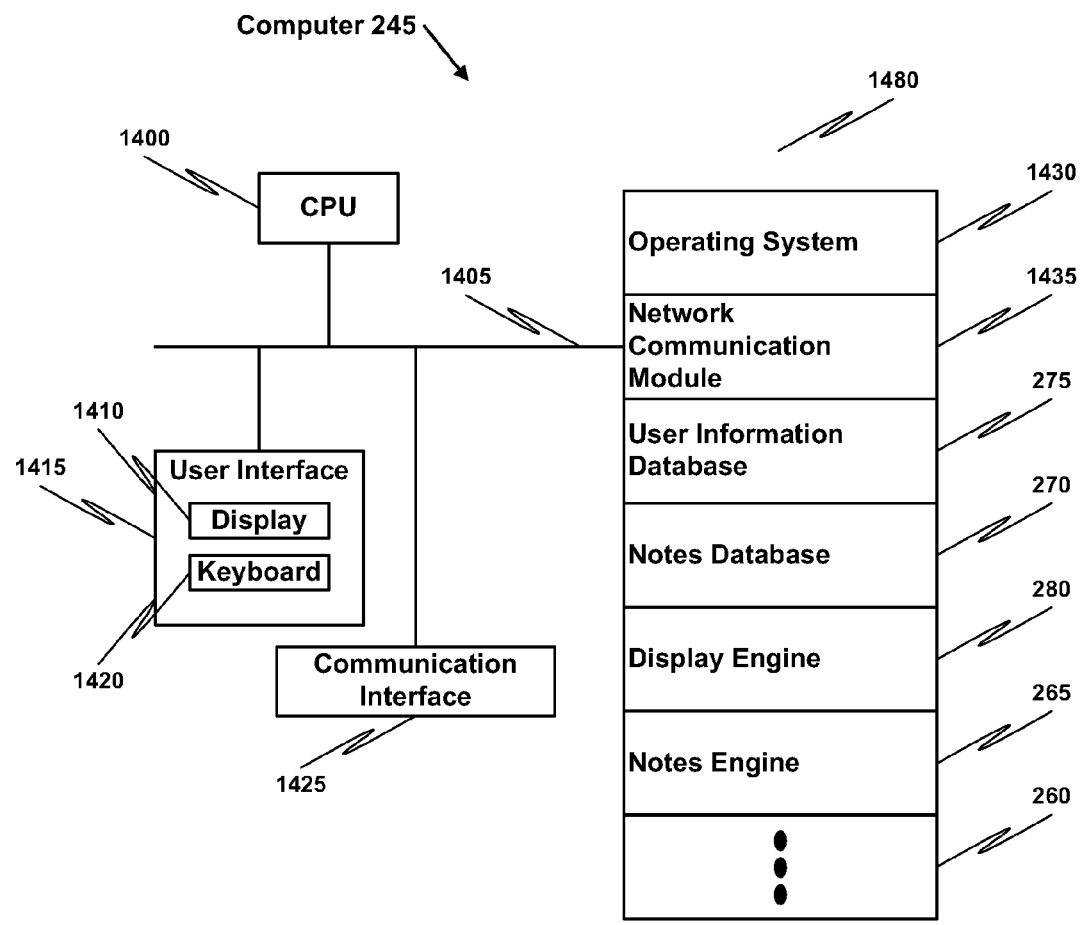
FIG. 14 depicts a server device in accordance with some embodiments of the present disclosure.

FIG. 14 depicts a server device in accordance with some embodiments of the present disclosure. A server 245 typically includes one or more processing units (CPU's) 1400, one or more network or other communications interfaces 1425, memory 1480, and one or more communication buses 1405 for interconnecting these components. The server 245 may include a user interface 1415, including a display 1410 and a keyboard 1420. The memory 1480 may include high speed random access memory and may also include non-volatile memory, such as one or more magnetic or optical storage disks. The memory 1480 may include mass storage that is remotely located from CPU's 1400. The memory 1480 may store the following elements, or a subset or superset of such elements: an operating system 1430 that includes procedures for handling various basic system services and for performing hardware dependent tasks; a network communication module (or instructions) 1435 that is used for connecting the server system 245 to other computers via the one or more communications interfaces 1425 (wired or wireless), such as the Internet, other wide area networks, local area networks, metropolitan area networks, and so on; a user information database 275 for storing user information, a notes database 270 for storing notes information, a display engine (or instructions) 280 for identifying what items to display and for formatting the items for display as described above, and a notes engine (or instructions) 265 for storing and displaying information regarding notes as described above.

Although illustrated and described in relation to client devices and server devices, it should be understood that the techniques described herein apply equally well to other types of computer networks (e.g. peer-to-peer). Furthermore, it should be understood that the techniques described herein apply equally to both wired and wireless networks. Further still, one of ordinary skill in the art will readily recognize that the techniques described herein can be applied to client applications other than applications for email or web browsing.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory 1370 or 1480 may store a subset of the modules and data structures identified above. Furthermore, memory 1370 or 1480 may store additional modules and data structures not described above.

Although some of various drawings illustrate a number of logical stages in a particular order, stages which are not order dependent may be reordered and other stages may be combined or broken out. Alternative orderings and groupings, whether described above or not, may be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for context-dependent social notes, comprising:
on a first client device associated with an identified user and having one or more processors and a memory storing one or more programs for execution by the one or more processors, the one or more programs including instructions for:
identifying a target audience entered in a first display at the first client device;
identifying one more notes entered in the first display;
identifying one or more preconditions entered in the first display, wherein the one or more preconditions indicate one or more conditions that must be met before the one or more identified notes are viewable by the target audience in a second display at a second client device associated with the target audience; and
sending information regarding the target audience, the one or more notes, and the one or more preconditions toward a server device, for making the one or more notes viewable by the target audience in accordance with the one or more preconditions;
wherein the one or more preconditions indicates the one or more identified notes are viewable by the target audience when the second client device executes an identified program on the second client device.

2. The method of claim 1 wherein the one or more preconditions indicates the one or more identified notes are viewable by the target audience beginning with an identified date.

3. The method of claim 1 wherein the one or more preconditions indicates the one or more identified notes are viewable by the target audience beginning with an identified time.

4. The method of claim 1 wherein the one or more preconditions indicates the one or more identified notes are viewable by the target audience beginning with an identified date and time.

5. The method of claim 1 wherein the one or more preconditions indicates the one or more identified notes are viewable by the target audience during an identified interval.

6. The method of claim 1 wherein the one or more preconditions indicates the one or more identified notes are viewable by the target audience when the second client device is within a predetermined distance of an identified geolocation.

7. The method of claim 1 wherein the one or more preconditions indicates the one or more identified notes are viewable by the target audience when the second client device renders an identified web page.

8. The method of claim 1 wherein the one or more preconditions indicates the one or more identified notes are viewable by the target audience upon the occurrence of an identified event.

9. The method of claim 1, further comprising:
identifying an expiration value entered in the first display, the expiration value indicating when the one or more identified notes are viewable by the target audience even if the one or more preconditions are not met.

10. A computer-implemented method for context-dependent social notes, comprising:
- on a server device having one or more processors and a memory storing one or more programs for execution by the one or more processors, the one or more programs including instructions for:
  - identifying a target audience received from a first client device;
  - identifying one more notes received from the first client device;
  - identifying one or more preconditions received from the first client device, wherein the one or more preconditions indicate one or more conditions that must be met before the one or more identified notes are viewable by the target audience in a display at a second client device associated with the target audience; and
  - sending information regarding the target audience, the one or more notes, and the one or more preconditions toward the second client device, for making the one or more notes viewable by the target audience in accordance with the one or more preconditions;
  - wherein the one or more preconditions indicates the one or more identified notes are viewable by the target audience when the second client device executes an identified program on the second client device.

11. The method of claim 10 wherein the one or more preconditions indicates the one or more identified notes are viewable by the target audience beginning with an identified date.

12. The method of claim 10 wherein the one or more preconditions indicates the one or more identified notes are viewable by the target audience beginning with an identified time.

13. The method of claim 10 wherein the one or more preconditions indicates the one or more identified notes are viewable by the target audience beginning with an identified date and time.

14. The method of claim 10 wherein the one or more preconditions indicates the one or more identified notes are viewable by the target audience during an identified interval.

15. The method of claim 10 wherein the one or more preconditions indicates the one or more identified notes are viewable by the target audience when the second client device is within a predetermined distance of an identified geolocation.

16. The method of claim 10 wherein the one or more preconditions indicates the one or more identified notes are viewable by the target audience when the second client device renders an identified web page.

17. The method of claim 10 wherein the one or more preconditions indicates the one or more identified notes are viewable by the target audience upon the occurrence of an identified event.

18. The method of claim 10, further comprising:
- identifying an expiration value received from the first client device, the expiration value indicating when the one or more identified notes are viewable by the target audience even if the one or more preconditions are not met.

19. A computer system for context-dependent social notes, comprising:
- one or more processors; and
- memory to store:
  - information regarding a target audience;
  - information regarding one or more notes;
  - information regarding one or more preconditions; and
  - one or more programs, the one or more programs comprising:
    - instructions for identifying the target audience entered in a first display at the first client device;
    - instructions for identifying the one more notes entered in the first display;
    - instructions for identifying the one or more preconditions entered in the first display, wherein the one or more preconditions indicate one or more conditions that must be met before the one or more identified notes are viewable by the target audience in a second display at a second client device associated with the target audience; and
    - instructions for sending information regarding the target audience, the one or more notes, and the one or more preconditions toward a server device, for making the one or more notes viewable by the target audience in accordance with the one or more preconditions;
  - wherein the one or more preconditions indicates the one or more identified notes are viewable by the target audience when the second client device executes an identified program on the second client device.

20. The computer system of claim 19 wherein the one or more preconditions indicates the one or more identified notes are viewable by the target audience beginning with an identified date.

21. The computer system of claim 19 wherein the one or more preconditions indicates the one or more identified notes are viewable by the target audience beginning with an identified time.

22. The computer system of claim 19 wherein the one or more preconditions indicates the one or more identified notes are viewable by the target audience beginning with an identified date and time.

23. The computer system of claim 19 wherein the one or more preconditions indicates the one or more identified notes are viewable by the target audience during an identified interval.

24. The computer system of claim 19 wherein the one or more preconditions indicates the one or more identified notes are viewable by the target audience when the second client device is within a predetermined distance of an identified geolocation.

25. The computer system of claim 19 wherein the one or more preconditions indicates the one or more identified notes are viewable by the target audience when the second client device renders an identified web page.

26. The computer system of claim 19 wherein the one or more preconditions indicates the one or more identified notes are viewable by the target audience upon the occurrence of an identified event.

27. The computer system of claim 19, the one or more programs comprising:
- instructions for identifying an expiration value entered in the first display, the expiration value indicating when the one or more identified notes are viewable by the target audience even if the one or more preconditions are not met.

28. A computer system for context-dependent social notes, comprising:
- one or more processors; and
- memory to store:
  - information regarding a target audience;
  - information regarding one or more notes;
  - information regarding one or more preconditions; and one or more programs, the one or more programs comprising:
    instructions for identifying the target audience received from a first client device;
    instructions for identifying the one more notes received from the first client device;
    instructions for identifying the one or more preconditions received from the first client device, wherein the one or more preconditions indicate one or more conditions that must be met before the one or more identified notes are viewable by the target audience in a display at a second client device associated with the target audience; and
    instructions for sending information regarding the target audience, the one or more notes, and the one or more preconditions toward the second client device, for making the one or more notes viewable by the target audience in accordance with the one or more preconditions;
    wherein the one or more preconditions indicates the one or more identified notes are viewable by the target audience when the second client device executes an identified program on the second client device.

29. The computer system of claim 28 wherein the one or more preconditions indicates the one or more identified notes are viewable by the target audience beginning with an identified date.

30. The computer system of claim 28 wherein the one or more preconditions indicates the one or more identified notes are viewable by the target audience beginning with an identified time.

31. The computer system of claim 28 wherein the one or more preconditions indicates the one or more identified notes are viewable by the target audience beginning with an identified date and time.

32. The computer system of claim 28 wherein the one or more preconditions indicates the one or more identified notes are viewable by the target audience during an identified interval.

33. The computer system of claim 28 wherein the one or more preconditions indicates the one or more identified notes are viewable by the target audience when the second client device is within a predetermined distance of an identified geolocation.

34. The computer system of claim 28 wherein the one or more preconditions indicates the one or more identified notes are viewable by the target audience when the second client device renders an identified web page.

35. The computer system of claim 28 wherein the one or more preconditions indicates the one or more identified notes are viewable by the target audience upon the occurrence of an identified event.

36. The computer system of claim 28, the one or more programs comprising:
    instructions for identifying an expiration value received from the first client device, the expiration value indicating when the one or more identified notes are viewable by the target audience even if the one or more preconditions are not met.

37. A nontransitory computer readable storage medium storing one or more programs configured to be executed by one or more processing units at a computer comprising:
    instructions for identifying a target audience entered in a first display at the first client device;
    instructions for identifying one more notes entered in the first display;
    instructions for identifying one or more preconditions entered in the first display, wherein the one or more preconditions indicate one or more conditions that must be met before the one or more identified notes are viewable by the target audience in a second display at a second client device associated with the target audience; and
    instructions for sending information regarding the target audience, the one or more notes, and the one or more preconditions toward a server device, for making the one or more notes viewable by the target audience in accordance with the one or more preconditions;
    wherein the one or more preconditions indicates the one or more identified notes are viewable by the target audience when the second client device executes an identified program on the second client device.

38. A nontransitory computer readable storage medium storing one or more programs configured to be executed by one or more processing units at a computer comprising:
    instructions for identifying a target audience received from a first client device;
    instructions for identifying one more notes received from the first client device;
    instructions for identifying one or more preconditions received from the first client device, wherein the one or more preconditions indicate one or more conditions that must be met before the one or more identified notes are viewable by the target audience in a display at a second client device associated with the target audience; and
    instructions for sending information regarding the target audience, the one or more notes, and the one or more preconditions toward the second client device, for making the one or more notes viewable by the target audience in accordance with the one or more preconditions;
    wherein the one or more preconditions indicates the one or more identified notes are viewable by the target audience when the second client device executes an identified program on the second client device.

39. A computer system for context-dependent social notes, comprising:
    one or more processors; and
    memory to store:
        one or more programs, the one or more programs comprising:
            instructions for identifying a target audience entered in a first display at the first client device;
            instructions for identifying one more notes entered in the first display;
            instructions for identifying one or more preconditions entered in the first display, wherein the one or more preconditions indicate one or more conditions that must be met before the one or more identified notes are viewable by the target audience in a second display at a second client device associated with the target audience; and
            instructions for sending information regarding the target audience, the one or more notes, and the one or more preconditions toward a server device, for making the one or more notes viewable by the target audience in accordance with the one or more preconditions;
            wherein the one or more preconditions indicates the one or more identified notes are viewable by the target audience when the second client device executes an identified program on the second client device.

40. A computer system for context-dependent social notes, comprising:
   one or more processors; and
   memory to store:
      one or more programs, the one or more programs comprising:
         instructions for identifying a target audience received from a first client device;
         instructions for identifying one more notes received from the first client device;
         instructions for identifying one or more preconditions received from the first client device, wherein the one or more preconditions indicate one or more conditions that must be met before the one or more identified notes are viewable by the target audience in a display at a second client device associated with the target audience; and
         instructions for sending information regarding the target audience, the one or more notes, and the one or more preconditions toward the second client device, for making the one or more notes viewable by the target audience in accordance with the one or more preconditions;
      wherein the one or more preconditions indicates the one or more identified notes are viewable by the target audience when the second client device executes an identified program on the second client device.

* * * * *